United States Patent [19]

Niihara

[11] Patent Number: 5,418,196

[45] Date of Patent: May 23, 1995

[54] SINTERED COMPOSITE BORON CARBIDE BODY AND PRODUCTION PROCESS THEREOF

[75] Inventor: Koichi Niihara, 7-1142, Korigaoka 9-chome,, Hirakata-shi, Osaka, Japan

[73] Assignees: Koichi Niihara; Sumitomo Electric Industries, Ltd., both of Japan

[21] Appl. No.: 804,842

[22] Filed: Dec. 6, 1991

[30] Foreign Application Priority Data

Dec. 12, 1990 [JP] Japan .................. 2-409844

[51] Int. Cl.⁶ .................. C04B 35/56; C04B 35/58
[52] U.S. Cl. .................. 501/87; 501/91; 501/92
[58] Field of Search .................. 501/87, 91, 92

[56] References Cited

U.S. PATENT DOCUMENTS

| | | | |
|---|---|---|---|
| 2,108,794 | 2/1938 | Boyer et al. | 501/91 |
| 2,109,246 | 2/1938 | Boyer et al. | 501/91 |
| 2,613,154 | 10/1952 | Montgomery | 501/87 |
| 3,765,300 | 10/1973 | Taylor et al. | 501/91 X |
| 3,808,012 | 4/1974 | Bailey et al. | 501/91 |
| 4,029,000 | 6/1977 | Nakamura | 501/87 X |
| 4,067,743 | 1/1978 | Arabei et al. | 501/91 |
| 4,081,284 | 3/1978 | Prochazka et al. | 501/91 |
| 4,320,204 | 3/1982 | Weaver | 501/91 |
| 4,518,702 | 5/1985 | Yoshida et al. | 501/90 |
| 4,524,138 | 6/1985 | Schwetz et al. | 501/90 |
| 4,904,623 | 2/1990 | Petzow et al. | 501/96 |
| 4,957,884 | 9/1990 | Knudsen et al. | 501/87 |
| 5,108,962 | 4/1992 | Khazai et al. | 501/87 |

FOREIGN PATENT DOCUMENTS 0055165  3/1988  Japan .

OTHER PUBLICATIONS

"Polykristalline, Porenfrei Sinterkorder Aus 2516, Borcarbid und Kohlenstoff, Herstellung nund Elgenschaffen", Schwetz et al, *Sprechsaal*, vol. 116 No. 12 (1983) no month.

*Primary Examiner*—Mark L. Bell
*Assistant Examiner*—David Sample
*Attorney, Agent, or Firm*—Jordan B. Bierman; Bierman and Muserlian

[57] ABSTRACT

A sintered composite boron carbide body with SiC and/or $TiB_2$ having a grain size of the order of nanometers and distributed among $B_4C$ crystal grains and/or within the $B_4C$ crystal grains is produced by hot-pressing a powder mix, which is composed of 44–99.5 vol. % $B_4C$, 0.5–60 vol. % SiC and/or 0.5–60 vol. % TiC, at 1,800–2,300° C. for 5–600 minutes.

5 Claims, 2 Drawing Sheets

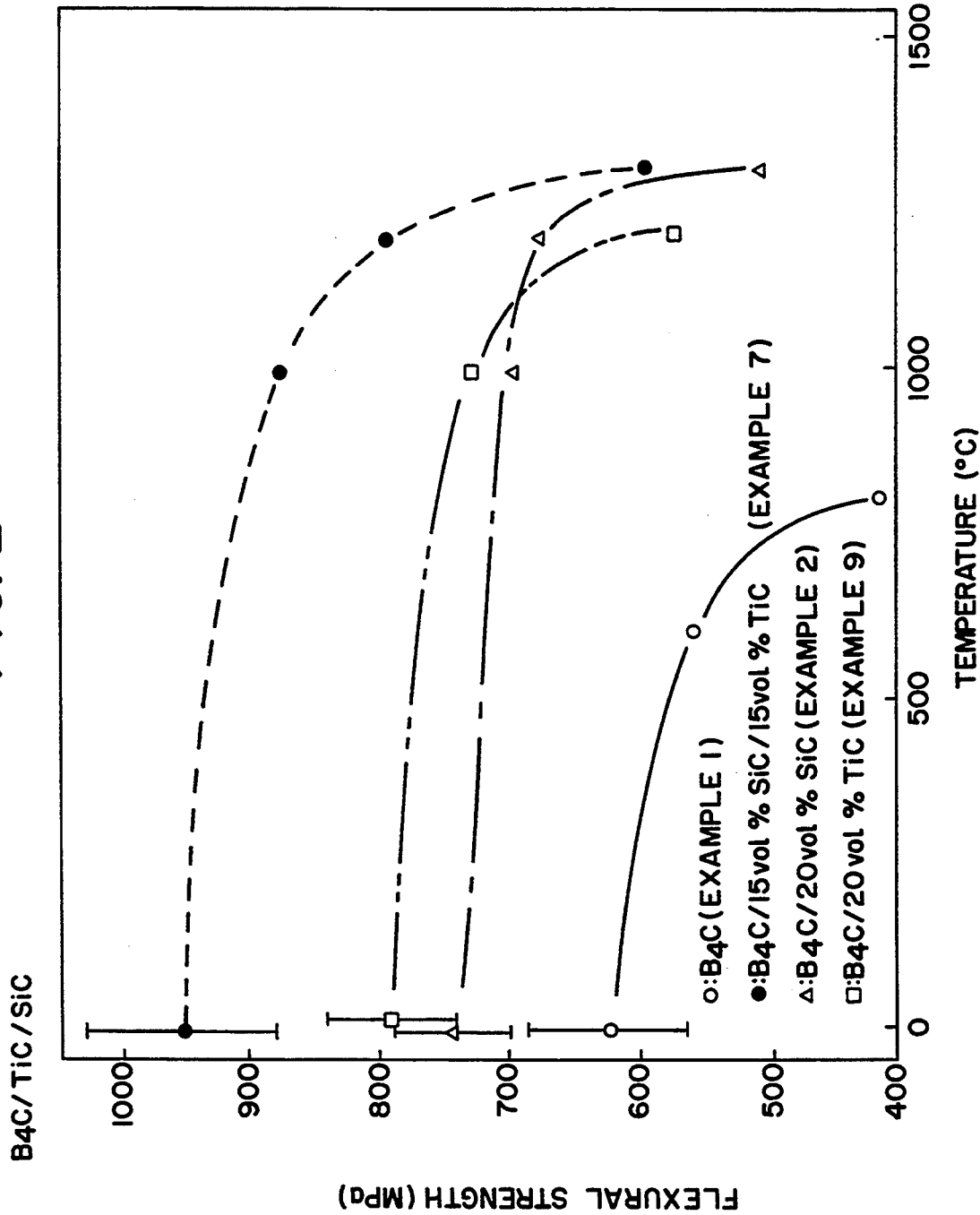

SINTERED COMPOSITE BORON CARBIDE BODY AND PRODUCTION PROCESS THEREOF

BACKGROUND OF THE INVENTION

1. Field of the Invention

This invention relates to a $B_4C$ ceramic material useful as an abrasive material, a wear- and abrasion-resistant material, a high-temperature material, an energy-related material or the like, and especially to improvements in its toughness and strength.

2. Description of the Related Art $B_4C$ ceramics are recently attracting interests as engineering ceramics for high-temperature structural members. To promote the use of $B_4C$ ceramics in fields where materials are required to exhibit high reliability and stability under severe conditions like car parts and aerospace materials, it is indispensable to improve their fracture toughness to overcome their brittleness and also to improve their high-temperature strength. As a technique for improved fracture toughness, it has heretofore been known, for example, to distribute silicon carbide whiskers in a silicon nitride matrix as disclosed in Japanese Patent Publication No. 62-265 173. This technique appears to bring about such improved fracture toughness because, upon fracture, whiskers may probably deflect propagating cracks and/or whiskers may perhaps be pulled out or tangled together. Fracture toughness can therefore be improved by the combined use of whiskers. The whiskers so incorporated however have a length on the order of 1–10 $\mu$m. In practice, it is difficult to completely avoid their aggregation by any mechanical means. Accordingly, such whisker aggregates, as coarse grains, tend to act as starting points of fracture, leading to a reduction in strength.

Therefore, it has heretofore been the practice either to add whisker or to subject $B_4C$ to grain growth so as to improve the fracture toughness owing to the inclusion of coarse grains. As a result, detects are indeed enlarged, thereby lowering the strength. It has thus been difficult to improve both strength and toughness.

SUMMARY OF THE INVENTION

An object of this invention is therefore to improve both strength and toughness in a structure of a $B_4C$ matrix formed of fine grains of uniform size free of coarse grains.

In one aspect of the present invention, there is thus provided a sintered composite boron carbide ($B_4C$) body. The body comprises $B_4C$ crystal grains and SiC and/or $TiB_2$ having a grain size of the order of nanometers and distributed among the $B_4C$ crystal grains and/or within the $B_4C$ crystal grains.

In another aspect of the present invention, there is also provided a process for the production of such a sintered composite boron carbide body. The process comprises mixing 40–99.5 vol. % $B_4C$ and 0.5–60 vol. % SiC and/or 0.5–60 vol. % TiC in an organic solvent, drying the resultant powder mix and then hot-pressing the thus-dried powder mix at 1,800–2,300° C. for 5–600 minutes.

The $B_4C$ ceramic body according to the present invention has excellent strength and fracture toughness at both room temperature and high temperatures, so that it can be used advantageously as a structural member which are required to have both high strength and high toughness, led by a car part.

BRIEF DESCRIPTION OF THE DRAWINGS

The above and other objects, features and advantages of the present invention will become apparent from the following description and the appended claims, taken in conjunction with the accompanying drawings, in which:

FIG. 2 diagrammatically depicts the relationship between atmosphere temperatures and flexural strength in the examples of the present invention.

DETAILED DESCRIPTION OF THE INVENTION AND PREFERRED EMBODIMENTS

Figure 1:
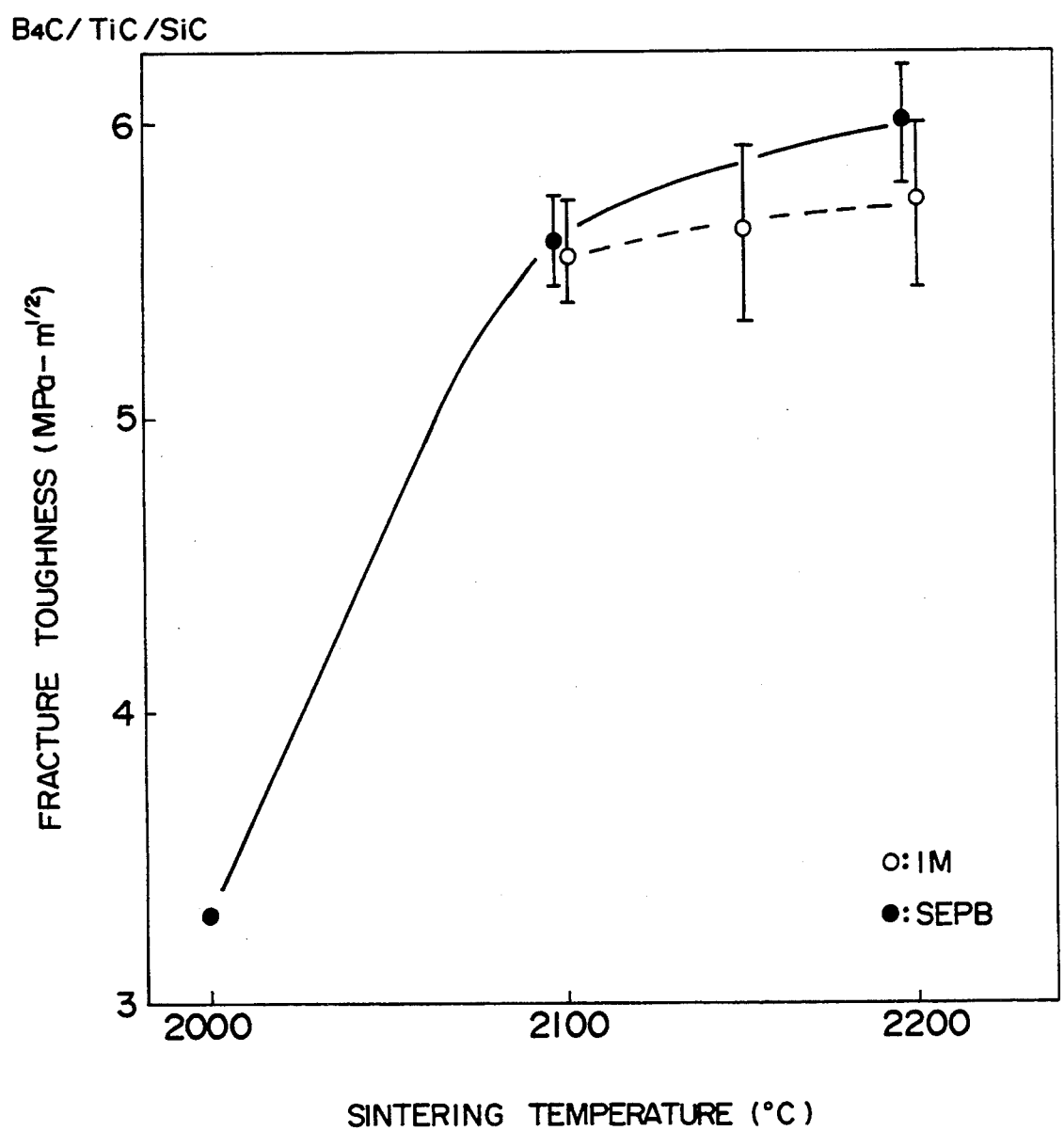
FIG. 1 diagrammatically shows the relationship between hot-pressing temperatures and corresponding fracture toughness in examples of the present invention.

The average grain size of the matrix-forming $B_4C$ crystal grains may be 3 $\mu$m or smaller, with fine grains of uniform size not greater than 0.5 $\mu$m being preferred. Formation of a structure in which SiC and/or $TiB_2$ having a grain size of the order of nanometers are distributed among and/or within such crystal grains can improve both strength and toughness because strength-reducing causes can be minimized owing to the small defect size of the resultant structure and residual stress has been produced in crystal grains owing to the incorporation of the grains of the nanometer order. The average grain size of the distributed SiC and/or $TiB_2$ may preferably be not greater than 500 nm, with 200 nm or smaller being particularly preferred. Preferably, the distributed SiC and/or $TiB_2$ may individually amount to 0.5–60 vol. %, with 0.5–30 vol. % being especially preferred, based on the total volume of the sintered body.

The fracture toughness of the sintered body according to this invention is at least 3 MPa.m$^{\frac{1}{2}}$.

The particularly preferred hot-pressing temperature may ranges from 2,000° to 2,300° C. while the especially preferred hot-pressing time ranges from 30 minutes to 300 minutes.

According to the present invention, grains of different kind or kinds, said grains having a larger coefficient of thermal expansion, are distributed in $B_4C$ crystal grains so that, when allowed to cool down from the sintering temperature to room temperature, residual compression stress is produced in $B_4C$ crystal grains because of the mismatching of their coefficients of thermal expansion. Upon fracture, leading ends of cracks enter stress fields so that greater resistance is produced against the formation and propagation of cracks, resulting in improved fracture toughness. Accordingly, the greater the difference in the coefficient of thermal expansion between $B_4C$ crystal grains and the grains of the different kind or kinds, the better. Owing to the inclusion of the grains of the different kind or kinds distributed on the order of nanometers in grain size in $B_4C$ grains, defects do not become larger so that the improved fracture toughness is also reflected as an improvement in the strength. Further, strain is developed by stress fields around the grains of the different kind or kinds distributed among $B_4C$ grains, whereby the movement of dislocation inside the $B_4C$ crystal grains is promoted around the grains of the different kind or kinds. As a result, planes of dislocation form sub-boundaries, so that the matrix grains are apparently rendered finer and the strength is improved. Further, grains of the different kind or kinds still remaining at grain boundaries serve to exhibit pinning effects against boundary sliding at high temperatures, so that the high-temperature strength is improved. The size of the distributed grains of the different kind or kinds is preferably 500 nm or smaller since any unduly large grain size results in a reduction in the effect to strengthen $B_4C$ crystal grains by residual compressive stress. The lower limit of the grain size may preferably be 1 nm, which is slightly greater than the state that such grains are present as a solid solution in an element form between lattices. Unduly small amounts of the distributed grains cannot bring about the effects which would otherwise be available from the combined use of SiC and/or $TiB_2$. On the other hand, excessively large amounts result in aggregation of the grains of the different kind or kinds. Therefore, the amount of SiC and/or $TiB_2$ may preferably be 0.5–60 vol. %, notably 0.5–30 vol. %.

In the production process of the present invention, TiC changes to $TiB_2$ in the $B_4C$ matrix at 1,400°–2200° C. during hot pressing so that $B_4C$ undergoes abnormal grain growth. The hot-pressing temperature may preferably be 1,800°–2,300° C., with 2,000°–2,200° C. being particularly preferred. For similar reasons, the hot-pressing time may preferably be 5–600 minutes, especially 30–300 minutes.

Examples 1-11

In each example, 100 g of $B_4C$ powder were mixed with SiC and/or TiC powders in their corresponding amounts shown in Table 1. They were wet-mixed in a ball mill. After the resultant mixture was dried, the resultant powder mix was hot-pressed at the HP (hot press) temperature for the HP time, both given in Table 1 to effect sintering.

The amounts of $TiB_2$ and SiC distributed among $B_4C$ grains in each body sintered as described above and the flexural strength and fracture toughness of the sintered body are shown in Table 2.

TABLE 1

| Ex. | Amount of TiC added (vol. %) | Amount of SiC added (vol. %) | HP temp./time (°C./min) |
|---|---|---|---|
| 1 | 0 | 0 | 2,150/30 |
| 2 | 0 | 20 | 2,150/30 |
| 3 | 5 | 10 | 2,000/30 |
| 4 | 5 | 20 | 1,900/60 |
| 5 | 10 | 15 | 2,100/30 |
| 6 | 10 | 30 | 2,100/600 |
| 7 | 15 | 15 | 2,150/30 |
| 8 | 15 | 30 | 2,150/30 |
| 9 | 20 | 0 | 2,150/30 |
| 10 | 25 | 5 | 2,200/30 |
| 11 | 30 | 15 | 2,200/100 |
| 12 | 30 | 20 | 2,200/60 |

TABLE 1-continued

| Ex. | Amount of TiC added (vol. %) | Amount of SiC added (vol. %) | HP temp./time (°C./min) |
|---|---|---|---|
| 13 | 40 | 5 | 2,200/60 |

TABLE 2

| Ex. | Amount of $TiB_2$ distributed (vol. %) | Amount of SiC distributed (vol. %) | Flexural strength (MPa) | $K_{IC}$ (MPa·m$^{\frac{1}{2}}$) |
|---|---|---|---|---|
| 1 | 0 | 0 | 630 | 5.81 |
| 2 | 0 | 20 | 750 | 5.92 |
| 3 | 5 | 10 | 645 | 3.33 |
| 4 | 5 | 20 | 710 | 3.16 |
| 5 | 10 | 15 | 985 | 5.59 |
| 6 | 10 | 30 | 1,025 | 5.88 |
| 7 | 15 | 15 | 950 | 5.75 |
| 8 | 15 | 30 | 1,045 | 6.01 |
| 9 | 20 | 0 | 795 | 5.74 |
| 10 | 25 | 5 | 895 | 5.93 |
| 11 | 30 | 15 | 1,105 | 6.36 |
| 12 | 30 | 20 | 860 | 5.34 |
| 13 | 40 | 5 | 720 | 4.86 |

Using the composition Of Example 8, the relationship between hot pressing temperature and fracture toughness was investigated. The results are diagrammatically shown in FIG. 1. Further, based on the compositions of Examples 1, 2, 7 and 9, the relationship between atmosphere temperature and flexural strength was also investigated. The results are diagrammatically depicted in FIG. 2. In FIG. 1, "IM" indicate data obtained in accordance with the indenter penetration method in the "Fracture Toughness Testing Method for Fine Ceramics" which is specified under JIS (Japan Industrial Standard) R1607, whereas "SEPB" show data obtained in accordance with the single-edge-precracked beam (SEPB) method also defined in the "Fracture Toughness Testing Method for Fine Ceramics".

What is claimed is:

1. A sintered composite boron carbide body comprising $B_4C$ matrix crystal grains having an average grain size of not more than 3 μm, and dispersed fine grains of SiC and/or $TiB_2$, having an average grain size of 1 to 500 nm, said dispersed fine grains being distributed within said matrix crystal grains.

2. The body of claim 1, wherein the fracture toughness of the body is at least 3 MPa.m$^{\frac{1}{2}}$.

3. The body of claim 1, wherein said dispersed fine grains of SiC and/or $TiB_2$ individually amount to 0.5–60 vol. %, based on the total volume of the body.

4. The body of claim 3, wherein the fracture toughness of the body is at least 3 MPa.m$^{\frac{1}{2}}$.

5. The body of claim 1 wherein a portion of said fine grains of SiC and/or $TiB_2$ is distributed within the $B_4C$ matrix crystal grains, and an additional portion thereof is distributed along boundaries of said crystal grains.

* * * * *